(12) United States Patent
Wu

(10) Patent No.: US 7,872,604 B2
(45) Date of Patent: Jan. 18, 2011

(54) SYSTEM AND METHOD FOR REDUCING INTERFERENCE IN MICROWAVE MOTION SENSORS

(75) Inventor: Xiaodong Wu, Roseville, CA (US)

(73) Assignee: Honeywell International Inc., Morristown, NJ (US)

( * ) Notice: Subject to any disclaimer, the term of this patent is extended or adjusted under 35 U.S.C. 154(b) by 291 days.

(21) Appl. No.: 11/961,387

(22) Filed: Dec. 20, 2007

(65) Prior Publication Data
US 2009/0160697 A1    Jun. 25, 2009

(51) Int. Cl.
*G01S 13/00* (2006.01)
(52) U.S. Cl. .......................................... 342/28; 342/27
(58) Field of Classification Search ................. 342/27, 342/28, 70–72
See application file for complete search history.

(56) References Cited

U.S. PATENT DOCUMENTS

| | | | | |
|---|---|---|---|---|
| 3,761,908 A * | 9/1973 | Gehman | .................. | 340/553 |
| 3,794,992 A * | 2/1974 | Gehman | .................. | 342/28 |
| 4,079,361 A * | 3/1978 | Woode | .................. | 342/27 |
| 4,308,536 A * | 12/1981 | Sims et al. | .................. | 342/70 |
| 4,328,487 A * | 5/1982 | Cheal | .................. | 340/554 |
| 4,346,774 A * | 8/1982 | Hirota et al. | .................. | 180/167 |
| 4,360,905 A * | 11/1982 | Hackett | .................. | 367/94 |
| 4,630,051 A * | 12/1986 | Adams et al. | .................. | 342/133 |
| 4,717,916 A * | 1/1988 | Adams et al. | .................. | 342/107 |
| 5,227,800 A * | 7/1993 | Huguenin et al. | .................. | 342/179 |
| 5,337,058 A * | 8/1994 | Cross | .................. | 342/188 |
| 5,512,834 A * | 4/1996 | McEwan | .................. | 324/642 |
| 5,760,660 A * | 6/1998 | Nagatsu et al. | .................. | 333/126 |
| 5,973,636 A * | 10/1999 | Okubo et al. | .................. | 342/70 |
| 6,043,790 A * | 3/2000 | Derneryd et al. | .................. | 343/853 |
| 6,057,802 A * | 5/2000 | Nealy et al. | .................. | 343/700 MS |
| 6,104,346 A * | 8/2000 | Rudish et al. | .................. | 342/424 |
| 6,107,955 A * | 8/2000 | Wagner | .................. | 342/70 |
| 6,127,965 A * | 10/2000 | McDade et al. | .................. | 342/159 |
| 6,239,736 B1 * | 5/2001 | McDonald et al. | .................. | 342/28 |
| 6,278,409 B1 * | 8/2001 | Zuta | .................. | 343/756 |
| 6,313,643 B1 * | 11/2001 | Tirkel et al. | .................. | 324/642 |
| 6,342,696 B1 * | 1/2002 | Chadwick | .................. | 250/225 |
| 6,359,582 B1 * | 3/2002 | MacAleese et al. | .................. | 342/22 |
| 6,377,202 B1 * | 4/2002 | Kropfli et al. | .................. | 342/26 R |
| 6,424,298 B1 * | 7/2002 | Nishikawa et al. | .................. | 343/700 MS |

(Continued)

OTHER PUBLICATIONS

"76 GHz post-wall waveguide fed parallel plate slot array with 45degree linear polarization", Hirokawa, J. Ando, M. , Dept. Of Electr. Eng., Tokyo Inst. of Technol. ;Microwave Symposium Digest., 2000 IEEE MTT-S International, 2000, vol. 3, On pp. 1973-1976 vol. 3.*

(Continued)

*Primary Examiner*—Thomas H Tarcza
*Assistant Examiner*—Peter Bythrow
(74) *Attorney, Agent, or Firm*—Husch Blackwell Welsh Katz

(57) ABSTRACT

A microwave sensor comprises an oscillator configured to generate a microwave signal at a pre-determined frequency, and an antenna configured to transmit the microwave signal and/or to receive reflected signals. The antenna is linear polarized at 45 degrees and the transmitted microwave signal has an electric field at 45 degrees to the plane of the horizontal. The microwave sensor further includes a signal processor coupled to the antenna and configured to process the reflected signals to determine a presence of a moving object.

30 Claims, 5 Drawing Sheets

U.S. PATENT DOCUMENTS

| | | | | |
|---|---|---|---|---|
| 6,587,246 | B1 * | 7/2003 | Anderton et al. | 359/212.2 |
| 6,825,456 | B2 * | 11/2004 | Chadwick et al. | 250/225 |
| 7,019,683 | B2 * | 3/2006 | Stevens et al. | 342/28 |
| 7,170,449 | B2 * | 1/2007 | Eide | 343/700 MS |
| 7,205,926 | B2 * | 4/2007 | Rowe et al. | 342/22 |
| 7,355,546 | B2 * | 4/2008 | Randall | 342/26 R |
| 7,423,604 | B2 * | 9/2008 | Nagai | 343/776 |
| 2003/0162566 | A1 * | 8/2003 | Shapira et al. | 455/561 |

OTHER PUBLICATIONS

"A Portable Coaxial Collinear Antenna" B.B. Balsley, W.L. Ecklund, IEEE Trans. Ant. Prop. AP-20(4), 513-516, 1972.*

* cited by examiner

SYSTEM AND METHOD FOR REDUCING INTERFERENCE IN MICROWAVE MOTION SENSORS

FIELD OF THE INVENTION

The present invention relates generally to microwave motion sensors and more particularly, to a method and system for improving performance in co-located microwave motion sensors.

DESCRIPTION OF THE RELATED ART

Typically, microwave sensors are used to detect moving objects in an area by sending microwave signals to a detection area. When an object (or an intruder, such as a person) passes through the detection area, the microwave signal is reflected back (echo) from such movement and is modulated due to the Doppler Effect. A signal reflected from a moving object (target) will be shifted in frequency. This shift in frequency is directly proportional to the object's velocity relative to the sensor. The maximum frequency shift is when the target is moving straight at the sensor and minimum frequency shift is observed if the object is moving at 90 degrees to the sensor. All Doppler sensors use this principle to detect moving objects in the detection area.

Currently microwave motion sensors are commonly operated with fixed pulse periods. If two such similar sensors are placed in close proximity to each other, these sensors will eventually interfere with each other due to component tolerances. Even if the sensors operate in a pulse mode, the pulsed microwave signal of one sensor will overlap the pulsed microwave signal of the other sensor. The resultant overlapped pulsed signal will cause the microwave sensors to become noisy and create false alarms. Such a condition typically occurs when two sensors are installed too close to each other or installed facing each other to cover a large area. In addition, the problem will occur when the microwave frequency of both the sensors is within a close range or the same as each other.

One method to overcome above mentioned problem is to set the sensors at different microwave frequencies. This requires the installer to carry many sensors at different frequencies. However, this practice increases the cost of operation for both manufacturer and the installer, and is not desirable.

Therefore, what is needed is a robust, reliable and cost effective microwave sensor that can be configured to prevent the interference between the sensors when the sensors are installed facing each other, even if they are set at the same frequency.

SUMMARY OF THE INVENTION

According to one embodiment of the present invention, a microwave sensor configured for cross polarized operation is provided. The microwave sensor comprises an oscillator configured to generate a microwave signal at a pre-determined frequency, an antenna configured to transmit the microwave signal and/or to receive reflected signals, wherein the antenna is linear polarized at 45 degrees, and a signal processor coupled to the antenna through a mixer and signal conditioning circuitry (sample/hold, filter, and amplifier) and configured to process the reflected signals to determine a presence of a moving object in a protected area.

According to another embodiment, the microwave sensor includes a pulse generator configured to set a pulse period for the transmitted microwave signals and also provide a gating signal to a sample and hold circuitry in a signal conditioning circuitry that is connected to the signal processor.

In another embodiment, the sensor can work in continuous waveform mode so that the pulse generator is not required.

A security system for detecting an intruder in a protected area is also provided. The security system comprises at least two microwave sensors located in the detection area facing each other. Each microwave sensor comprises an oscillator configured to generate a microwave signal at a pre-determined frequency, an antenna configured to transmit the microwave signal and to receive reflected signals, wherein the antenna is linear polarized at 45 degrees, and a signal processor coupled to a receiver which includes a mixer and a signal condition circuitry and configured to process the reflected signals to determine if there is a moving object. The electric fields generated by the transmitted microwave signal from each microwave sensor are perpendicular to each other, and result in a cross polarized operation so that the interference problem will be overcome even when the overlapped pulse signals appear and the sensors are at the same frequency.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

As used herein, the term "a" or "an" refers to "at least one". As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Figure 1:
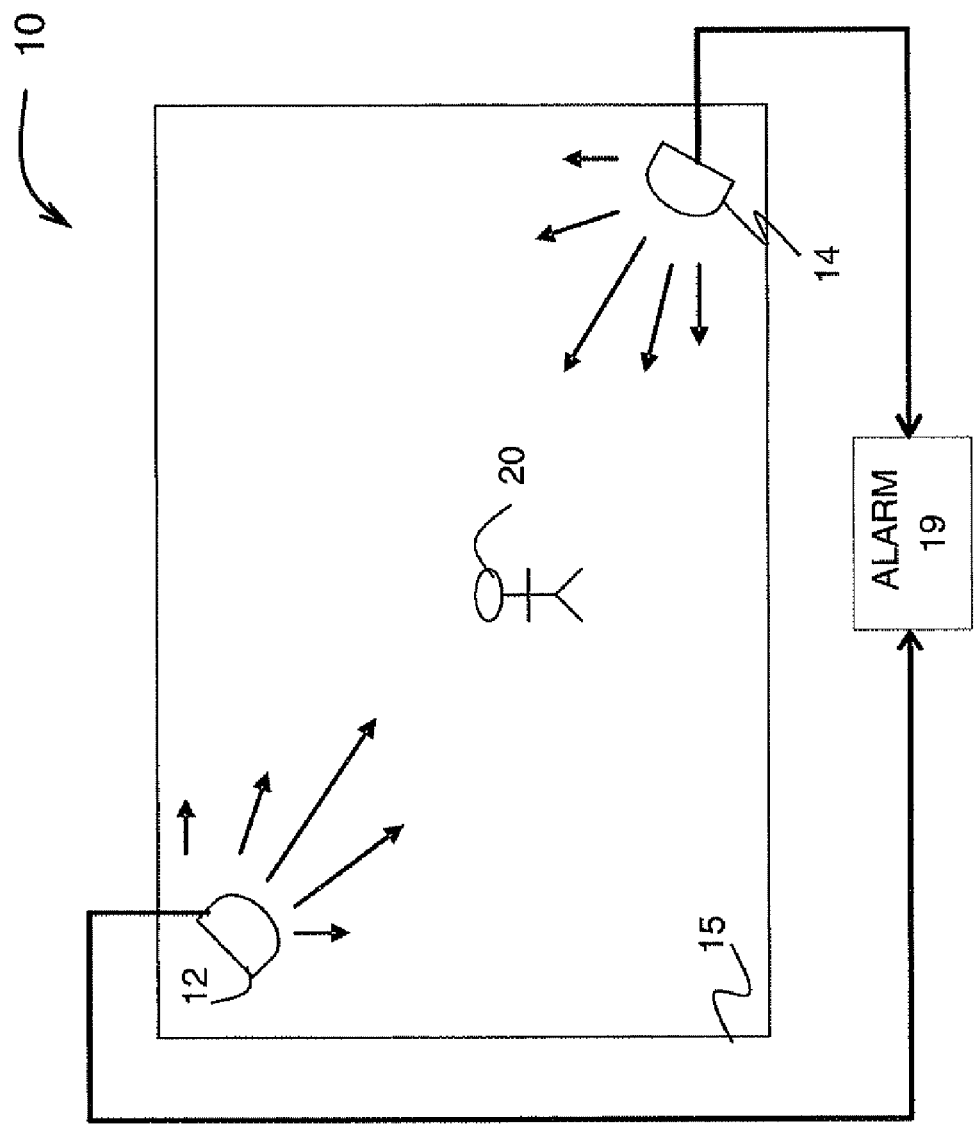
FIG. 1 is a block diagram of an embodiment of a security system implemented according to one aspect of the present invention.

FIG. 1 is a block diagram of an embodiment of a security system 10 implemented using microwave sensors according to one aspect of the present invention. The security system is shown by way of example only. It may be noted the microwave sensors disclosed below can be implemented in various other system such as radar systems, motion detection systems etc with more than two sensors. The security system 10 implementing the microwave sensors is described in further detail below.

The security system 10 comprises microwave sensors 12 and 14 respectively. The security system 10 is configured to detect a motion of an object 20 within a detection area (or secured area) 15. The security system 10 may further include a management module (not shown) to manage and coordinate inputs from the multiple microwave sensors, and further manage alarms or warning indicators, among other functions. In the illustrated embodiment, the microwave sensor 12 is disposed facing the microwave sensor 14. As used herein, 'face each other' refers to an arrangement where a transmitting side of a microwave sensor is in front of a transmitting side of another microwave sensor, or the non-transmitting side of a microwave sensor is behind a non-transmitting side of another sensor.

The microwave sensors are configured to generate microwave signals into the detection area 15. Microwave sensors are further adapted to receive the reflected signals that are reflected by the object 20. The characteristics of the reflected signals are analyzed to determine if there has been a security breach in the secured area. Upon detection of a security breach caused by the moving object 20 by any one of the microwave sensors, an alarm 19 is activated.

The alarm is coupled to each microwave sensor in the detection area. In the illustrated embodiment, the alarm is situated outside the detection area 15. For example, the alarm can also be situated in a control room (not shown) located away from the detection area 15. The alarm 19 can also be located in detection means 15. The alarm is configured to be activated by any one of the microwave sensors 12, 14.

Figure 2:
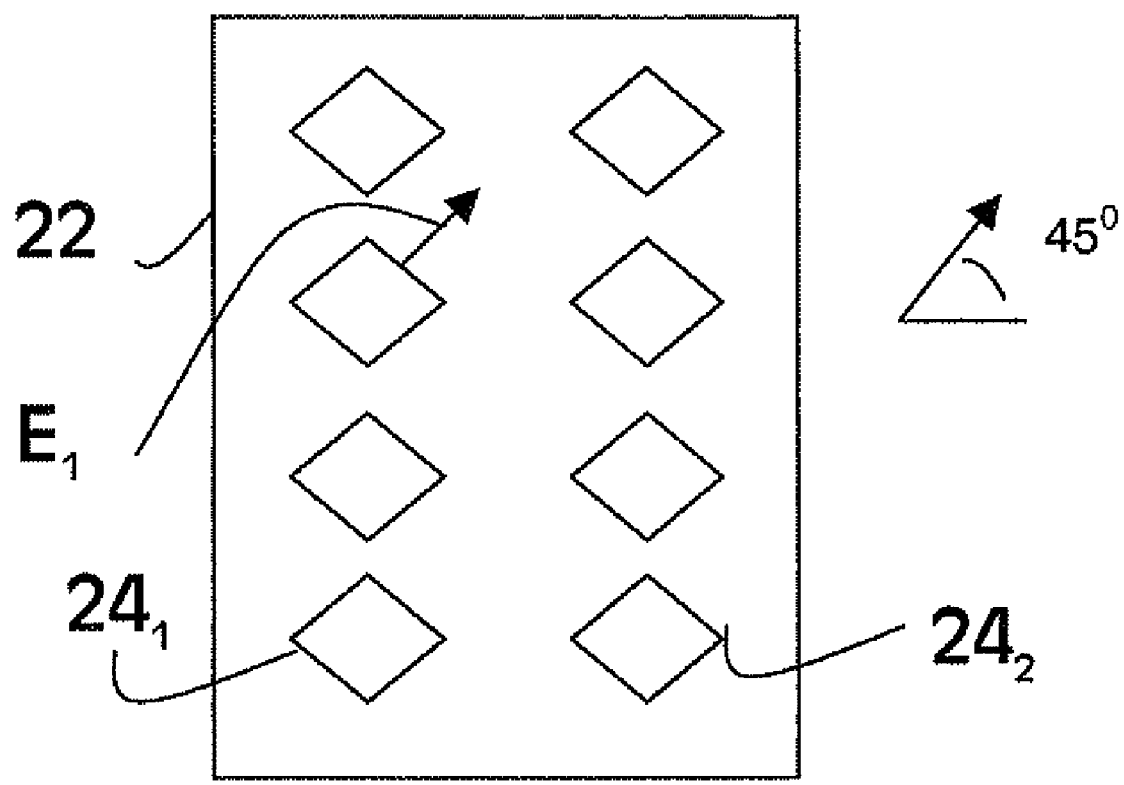
FIG. 2 illustrates a 45 degrees linear polarized antenna array according to an embodiment of the invention.

FIG. 2 illustrates an antenna array 22 of a microwave sensor, for example, the microwave sensor 12, according to an embodiment of the present invention. The antenna array 22 includes multiple antennas $24_1$, $24_2$, ... $24_N$, generally referred to as the antennas 24. The antennas 24 are linearly polarized antennas. Advantageously, the antennas 24 are linearly polarized such that the electric field "$E_1$" generated by the antennas 24 is oriented at 45 degrees. In one embodiment, the field is 45 degrees with respect to the horizontal. The antenna array can be a patch array or a slot array. The arrays may be a 1×4, 2×2 or N×M array depending on the particular security requirements. The antenna can also be a non-array antenna, such as a single patch, single slot or horn antenna, as long as it is linearly polarized at 45 degrees. The antenna can also be a combination of the above antennas.

Figure 3:
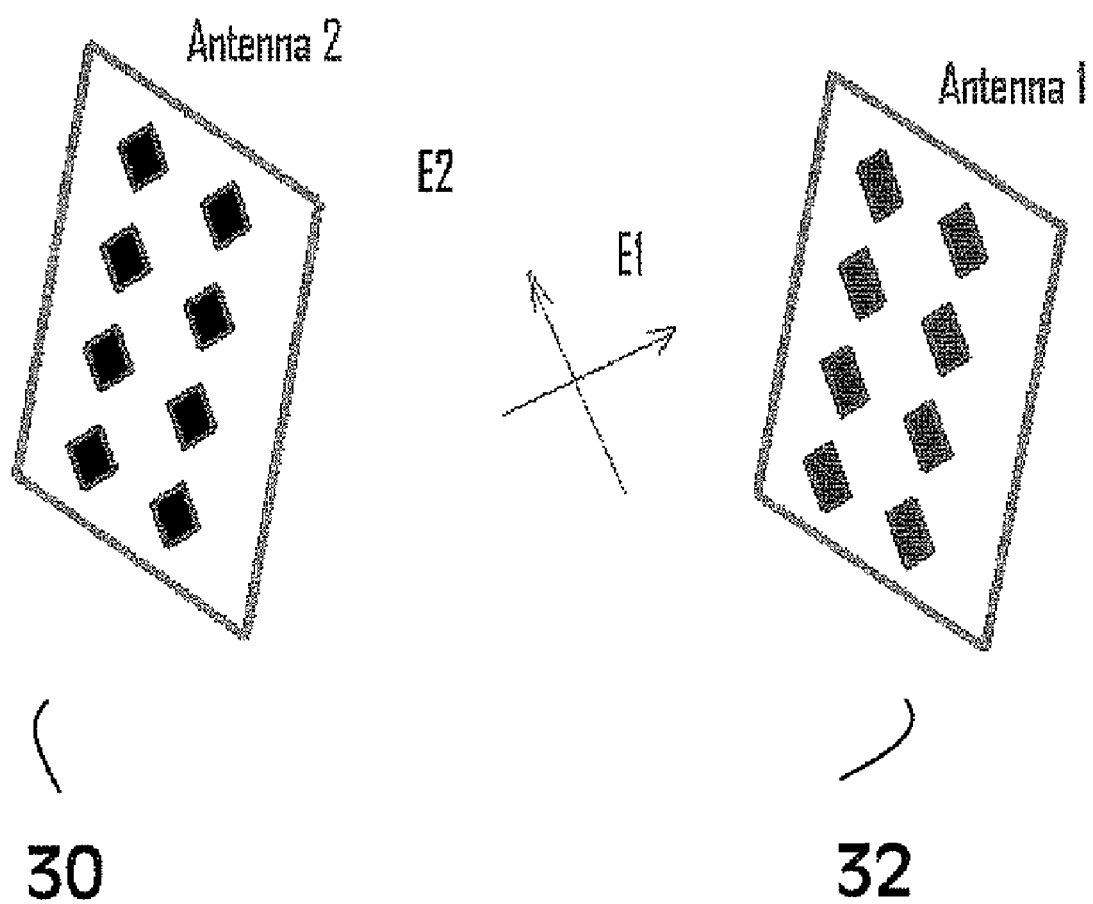
FIG. 3 illustrates an operation of microwave sensors of FIG. 1, according to one embodiment of the invention.

FIG. 3 illustrates the antennas of two microwave sensors facing each other. The microwave sensors may be for example the microwave sensor 12 facing the microwave sensor 14. The antenna 30 is coupled to the microwave sensor 12 and the antenna 32 is coupled to the microwave sensor 14. As illustrated, the field $E_1$ of the microwave sensor 12 projects out at 45 degrees to the horizontal, and as shown, intersects the field $E_2$ of the microwave sensor 14 at 90 degrees. That is, the two fields $E_1$ and $E_2$ are perpendicular to each other. This configuration enables a cross polarized operation of the microwave sensors that advantageously eliminates the interference or coupling of the signals from the facing microwave sensor. The cross polarized operation configuration beneficially tackles the issue of noise or false alarms in the microwave sensors, as prevalent in some the prior art sensors.

The antennas, for example, the antennas 22, 30 or 32, are further configured to receive any reflected signals from an object in the secured area.

Figure 4:
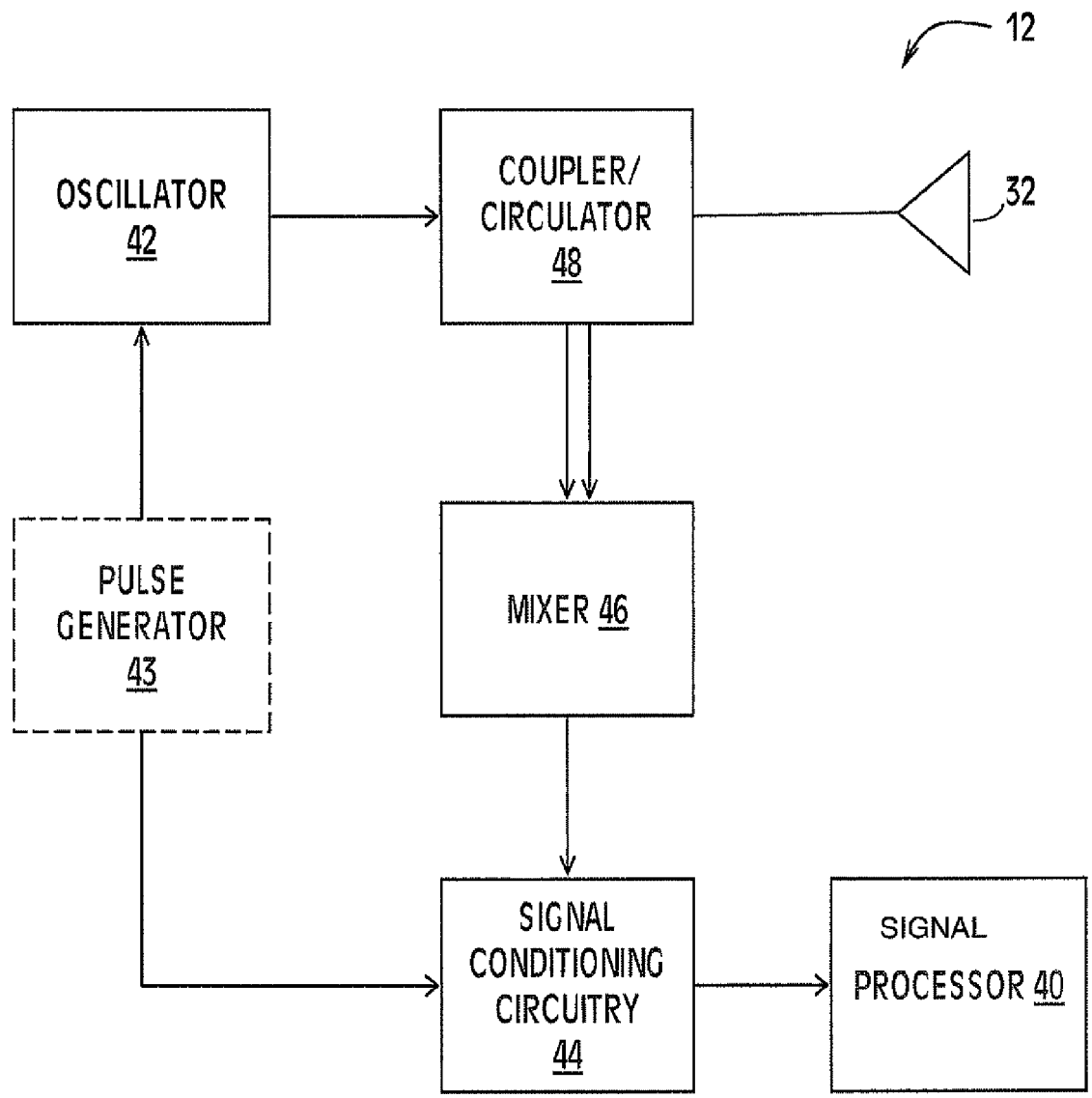
FIG. 4 is a block diagram of an embodiment of a microwave sensor implemented according to one aspect of the present invention.

As shown in FIG. 4, the various components of the microwave sensors are shown. For example the microwave sensor comprises a signal processor 40, an oscillator 42, a signal conditioning circuitry 44, a mixer 46, a coupler 48 and an antenna 32. The signal processor 40 is coupled to the signal conditioning circuitry 44 and configured to process the reflected signals to determine the presence of a moving object. In one embodiment, the signal processor 40 is further configured to generate an alarm signal. In another embodiment, the signal processor 40 is configured to trigger an alarm.

The mixer 46 is configured to condition the reflected signals received from the antenna 32. The mixer 46 is configured to mix the reflected signals with a portion of the transmitted microwave signal to generate a corresponding intermediate frequency signal which is sent to the signal conditioning circuitry 44 where the intermediate frequency signal is sampled, amplified and filtered. The intermediate frequency signal is then processed by the signal processor 40. A coupler 48 is configured to couple the antenna 32 to the oscillator 42 and the mixer 46. In another embodiment, the coupler 48 can be replaced by a circulator. In one embodiment, the sensor 12 has a separate transmitting antenna (not shown) and a separate receiving antenna (not shown). The additional receiving antenna may be coupled to the mixer 46.

In one embodiment, a pulse generator 43 may be optionally included. The pulse generator 43 is further configured to synchronize the transmitting antenna and a sample and hold circuit in the signal conditioning circuitry 44 by sending a gating signal to the signal conditioning circuitry 44. In one embodiment, the pulse generator 43 and the signal processor 40 can be part of a microcontroller, DSP chip or an ASIC.

In another embodiment, the sensor 12 works in a continuous wave mode, and a pulse generator is not required to be included in the sensor.

The manner in which the microwave sensor operates is described in further detail below with reference to FIG. 5.

Figure 5:
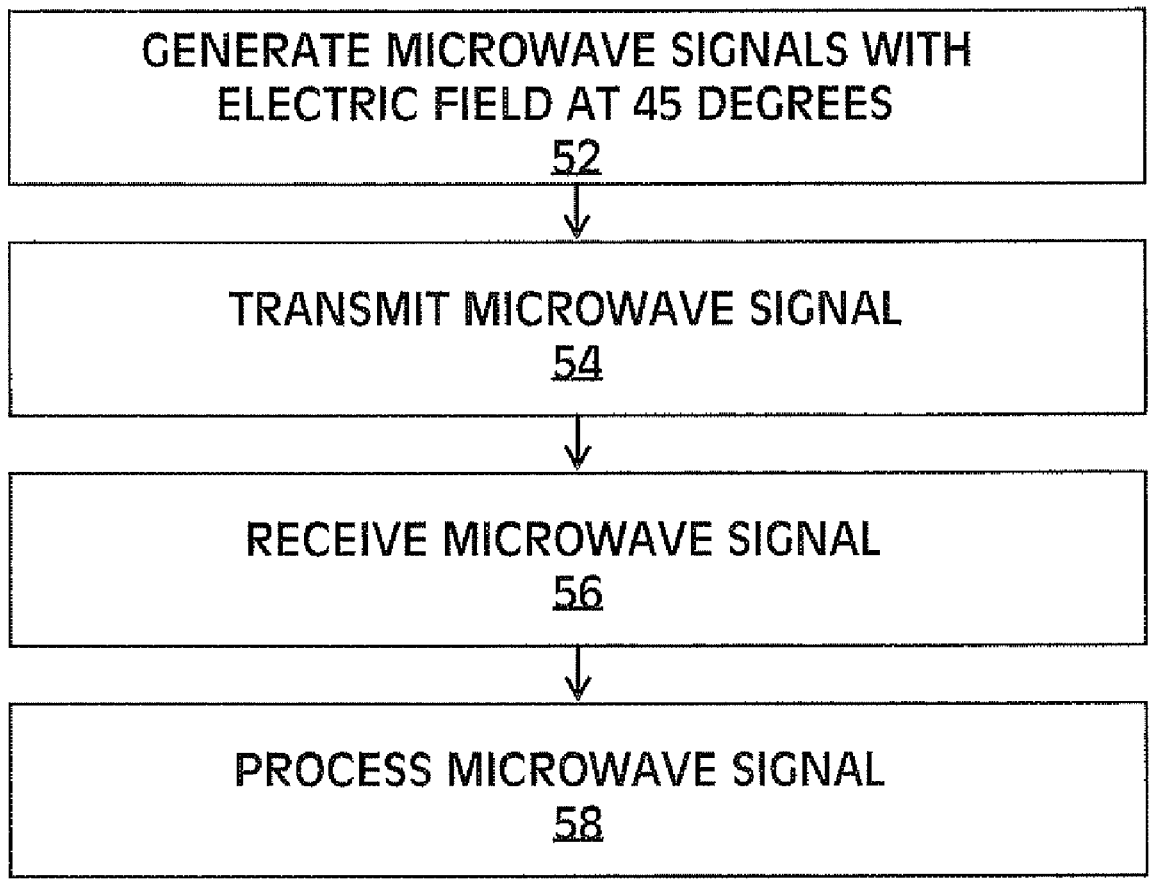
FIG. 5 is a flow chart illustrating one method for detecting a presence of an object according to one aspect of the present invention.

FIG. 5 is a flow chart illustrating one method for detecting a presence of a moving object according to one aspect of the present invention. For clarity, it is assumed that only two microwave sensors are employed for detecting the presence of the object. However, it may be understood that any number of microwave sensors may be employed using the present technique. Each step is described in further detail below.

At step 52, for the security system as shown in the FIG. 1, two microwave signals are generated from two microwave sensors sources. In one embodiment, the microwave signals are generated at a pre-determined frequency. The two microwave sensors are located in close proximity to each other. The microwave signals that are generated such that the associated electric field is at an angle of 45 degrees to the horizontal plane. This is enabled, for example, by the two microwave sensors being linearly polarized to generate signals with an electric field of 45 degrees relative to the horizontal plane. Further, the electric fields, of the two microwave sensors facing each other, are perpendicular to each other. Thus, the two microwave sensors operate in a cross polarized mode.

At step 54, the microwave signals are transmitted using an antenna. In one embodiment, the transmitter comprises a transmitting antenna. In the presence of a moving object on the transmitted path of the microwave signal, a portion of the microwave signal is reflected back towards its source. Due to the motion of the object, the frequency of the reflected microwave signal is shifted in accordance with the Doppler shift.

At step 56, the reflected signals are received by a receiver. In one embodiment, the receiver comprises an antenna. In a further embodiment, the receiving antenna is also configured to operate as a transmitting antenna.

At step 58, the reflected signals are processed to determine a presence of a moving object in the protected area.

The above-described invention has several advantages including substantially lowered interference even when the microwave sensors are installed facing each other. By deploying the microwave sensors as disclosed, and in a cross polarized operation configuration, the issue of overlapping pulse widths is minimized even when the transmitting microwave frequency is the same. The system therefore is more reliable as the occurrence of false alarms is considerably reduced. Further, the noise due to overlapping pulses is also reduced providing better overall performance.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A security system comprising:
    a first microwave sensor having a linearly polarized antenna with an electric field oriented at 45 degrees with respect to the horizon the linear polarized antenna transmits a microwave signal parallel to the plane of the horizon and receives reflected signals, wherein the transmitted microwave signal has an electric field at 45 degrees to the plane of the horizontal; and
    a second microwave sensor, the second microwave sensor further comprising
    an oscillator configured to generate a microwave signal at a pre-determined frequency;
    a linearly polarized antenna having an electric field oriented at 45 degrees with respect to the horizon configured to transmit the microwave signal parallel to the plane of the horizon and to receive reflected signals, wherein the transmitted microwave signal has an electric field at 45 degrees to the plane of the horizontal;
    a signal processor coupled to the antenna and configured to process the reflected signals to determine a presence of a moving object; and
    a mixer coupled to the antenna and the oscillator and configured to mix the reflected signal with a portion the transmitted microwave signal to generate a corresponding inteimediate frequency wherein the linear polarized antenna of the first and second microwave sensors face each other and wherein the electric fields of the linear polarized antenna of the first and second microwave sensors are perpendicular to each other.

2. The microwave sensor of claim 1, wherein the antenna comprises one of a single patch antenna, patch array, a single slot antenna, a slot array, a horn antenna, and a combination thereof.

3. The microwave sensor of claim 1, wherein the antenna comprises sensors in one of a 1×2 array, 2×2 array or N×M array.

4. The microwave sensor of claim 1, wherein the processor is further configured to generate an alarm based on the presence of a moving object.

5. The microwave sensor of claim 1, wherein the antenna further comprises a separate transmitting antenna and a separate receiving antenna.

6. The microwave sensor of claim 5, wherein the transmitting antenna and the receiving antenna are both linear polarized at 45 degrees.

7. The microwave sensor of claim 5, farther comprising a pulse generator configured to synchronized the transmitter and the sample/hold circuit in a signal conditioning circuitry by providing a gating signal to the signal conditioning circuitry.

8. The microwave sensor of claim 1, further comprising a signal conditioning circuitry coupled to the mixer and the signal processor and configured to condition the reflected signals, by sampling and holding, filtering and amplifying the signals.

9. A method for detecting a presence of a moving object, the method comprising:
    generating a plurality of microwave signals at a corresponding pre-deteimined frequency;
    a first linearly polarized antenna with an electric field oriented at 45 degrees with respect to the horizon transmitting the plurality of microwave signals parallel to the horizon;
    a second linearly polarized antenna with an electric field oriented at 45 degrees with respect to the horizon transmitting the plurality of microwave signals parallel to the horizon;
    receiving a plurality of reflected signals from the first and second linearly polarized antenna; and
    processing the reflected signals from the first and second linearly polarized antenna to determine a presence of a moving object wherein processing the reflected signals includes mixing the reflected signals from each of the first and second linear polarized antenna with a portion of the transmitted microwave signal of the linear polarized antenna to generate a corresponding intermediate frequency mixed signal wherein the first and second linear polarized antenna face each other and wherein the electric fields of the first and second linear polarized antenna are perpendicular to each other.

10. The method of claim 9, further comprising conditioning the mixed signal prior to the processing step.

11. The method of claim 9, further comprising generating an alarm based on the presence of the moving object.

12. A security system comprising:
    at least two microwave sensors located in the detection area facing each other, each microwave sensor comprising:
    an oscillator configured to generate a microwave signal at a pre-determined frequency;
    a linearly polarized antenna configured to transmit the microwave signal parallel to the horizon and/or to receive reflected signals, wherein an electric field of the antenna is linear polarized at 45 degrees with respect to the horizon;
    a signal processor coupled to the antenna and configured to process the reflected signals to deteimine a presence of a moving object; and
    a mixer coupled to the antenna and the oscillator and configured to mix the reflected signals with a portion of the transmitted microwave signal to generate a corresponding intermediate frequency mixed signal wherein the linear polarized antenna of the first and second microwave sensors face each other and wherein the electric fields of the linearly polarized antenna of the at least two microwave sensors are perpendicular to each other.

13. The security system of claim 12, wherein the microwave sensor further comprises a signal conditioning circuitry configured to condition the mixed signal prior to being processed.

14. The security system of claim 12, wherein the antenna comprises one of a patch array, a slot array, a single patch, a single slot, a horn antenna, and a combination thereof.

15. The security system of claim 12, wherein for each of the at least two microwave sensors, the microwave signal has an electric field at 45 degrees to the horizontal and parallel to the plane of the corresponding microwave sensor.

16. The security system of claim 12, further. comprising an alarm coupled to each microwave sensor, wherein the microwave sensor is configured to trigger the alarm based on the presence of a moving object.

17. The security system of claim 12, wherein electric fields of the at least two microwave sensors are perpendicular to each other.

18. The security system of claim 12, wherein the at least two microwave sensors achieve a cross polarized operation.

19. A security system comprising:
- a first microwave sensor having a linear polarized antenna that transmits the microwave signal parallel to the plane of the horizon and receives reflected signals, wherein the linear polarized antenna exhibits a selected amount of linear polarization, and wherein the transmitted microwave signal has an electric field oriented at 45 degrees relative to the plane of the horizontal; and
- a second microwave sensor further comprising:
- an oscillator configured to generate a microwave signal at a pre-determined frequency;
- a linearly polarized antenna configured to transmit the microwave signal parallel to the plane of the horizon and to receive reflected signals, wherein the antenna exhibits a selected amount of linear polarization, and wherein the transmitted microwave signal has an electric field oriented at 45 degrees relative to the plane of the horizontal;
- a signal processor coupled to the antenna and configured to process the reflected signals to determine a presence of a moving object and generate an alarm based on the presence of a moving object; and
- a mixer coupled to the antenna and the oscillator and configured to mix the reflected signal with a portion of the transmitted microwave signal to generate a corresponding intermediate frequency signal wherein the linear polarized antenna of the first and second microwave sensors face each other and wherein the electric fields of the linear polarized antenna of the first and second microwave sensors are perpendicular to each other.

20. The microwave sensor of claim 19, further comprising signal conditioning circuitry coupled to the mixer and the signal processor and configured to condition the reflected signals, by sampling and holding, filtering and amplifying the signals.

21. The microwave sensor of claim 19, wherein the antenna comprises one of a single patch antenna, patch array, a single slot antenna, a slot array, a horn antenna, and a combination thereof.

22. The microwave sensor of claim 19, wherein the antenna comprises one of a 1×2 array, 2×2 array or N×M array.

23. The microwave sensor of claim 19 wherein the antenna further comprises a separate transmitting antenna and a separate receiving antenna and where the transmitting antenna and the receiving antenna are both linearly polarized at 45 degrees.

24. The microwave sensor of claim 23, further comprising a pulse generator configured to synchronize the transmitter and the sample/hold. circuit in signal conditioning circuitry by providing 'a gating signal to the signal conditioning circuitry.

25. A method for detecting a presence of a moving object, the method comprising:
- providing first and second linearly polarized antenna that face each other;
- generating a plurality of microwave signals at a corresponding pre-determined frequency;
- transmitting at least some of the plurality of microwave signals from each of the first and second linearly polarized antenna parallel to the horizon with an electric field of the linearly polarized antenna oriented at 45 degrees with respect to the horizon and wherein the electric fields of the first and second linearly polarized antenna are perpendicular to each other;
- receiving a plurality of reflected signals;
- processing the reflected signals to determine a presence of a moving object; and
- generating an indicium indicative of the presence of the moving object, wherein processing the reflected signals includes mixing the reflected signals with a portion of the transmitted microwave signal to generate a corresponding intermediate frequency mixed signal.

26. A security system comprising:
- at least two microwave sensors located in the detection area facing each other, each microwave sensor comprising:
- an oscillator configured to generate a microwave signal at a pre-determined frequency;
- at least one linearly polarized antenna configured to transmit the microwave signal parallel to the horizon and/or to receive reflected signals, wherein the antenna is linearly polarized with an electric field at 45 degrees with respect to the horizon;
- a signal processor coupled to the antenna and configured to process the reflected signals to deteimine a presence of a moving object; and
- a mixer coupled to the antenna and the oscillator and configured to mix the reflected signals with a portion of the transmitted microwave signal to generate a corresponding intermediate frequency mixed signal and wherein the electric fields of the at least two linearly polarized antenna are perpendicular to each other.

27. The security system of claim 26, wherein the microwave sensor further comprises a signal conditioning circuitry configured to condition the mixed signal prior to being processed.

28. The security system of claim 27, wherein for each of the at least two microwave sensors, the microwave signal has an electric field at 45 degrees to the horizontal and parallel to the plane of the corresponding microwave sensor.

29. The security system of claim 26, wherein electric fields of the at least two microwave sensors are perpendicular to each other.

30. The security system of claim 26, wherein the at least two microwave sensors achieve a cross polarized operation.

* * * * *